No. 750,538. Patented January 26, 1904.

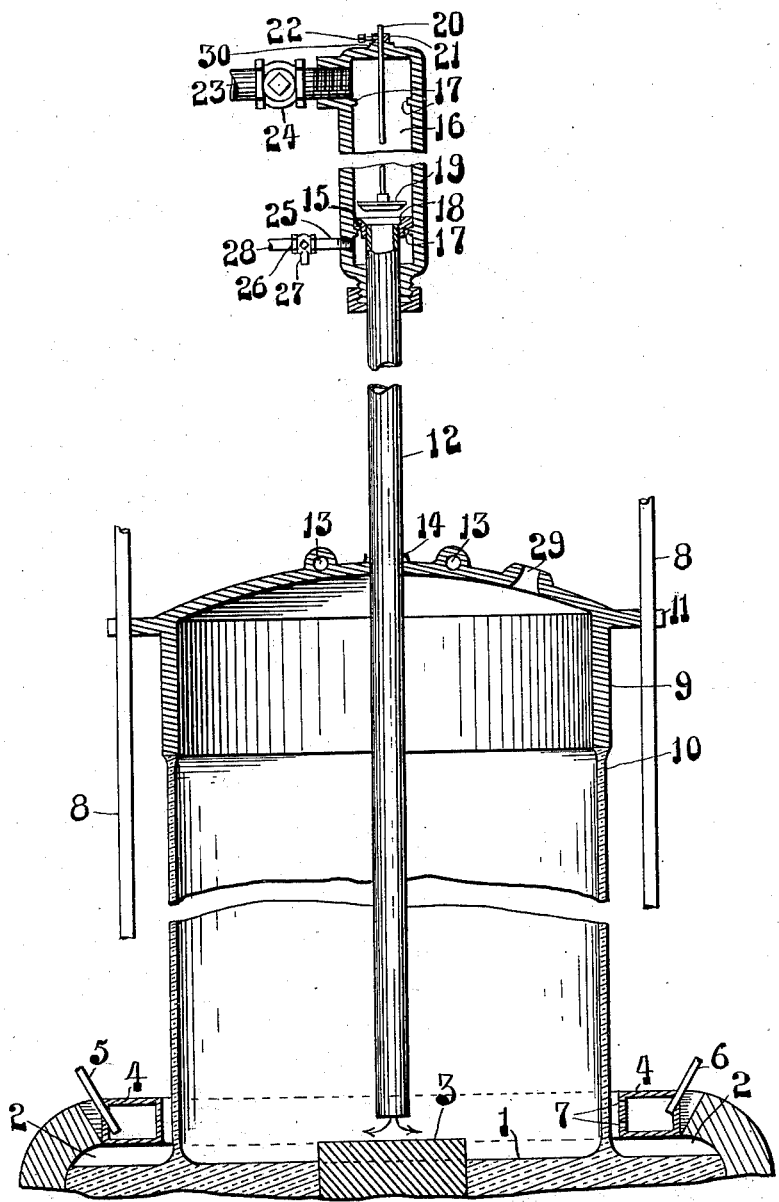

UNITED STATES PATENT OFFICE.

GEORGE H. HARVEY, OF BOROUGH OF GLENFIELD, PENNSYLVANIA.

GLASS-DRAWING MACHINE.

SPECIFICATION forming part of Letters Patent No. 750,538, dated January 26, 1904.

Application filed December 29, 1903. Serial No. 186,945. (No model.)

*To all whom it may concern:*

Be it known that I, GEORGE H. HARVEY, a citizen of the United States, residing at Glenfield borough, in the county of Allegheny and State of Pennsylvania, have invented or discovered new and useful Improvements in Glass-Drawing Machines, of which the following is a specification.

The accompanying drawing is a vertical section showing a tank or receptacle for glass in a workable condition and an apparatus for drawing glass therefrom in cylindrical or other inclosed form.

The purpose of the invention herein set forth is to equalize the temperature maintained at the apex of the draw of glass—that is, at the summit of the annular taper of the molten glass at the point where it forms into a cylinder.

I obtain the above results, preferably, as follows, reference being had to the drawing, which is, however, merely illustrative of the general principles of my invention.

Glass 1 in a liquid or semiliquid state is contained in a receptacle 2, which receptacle may be of any desired design—as, for instance, part of the general glass pot or tank or auxiliary thereto or independent thereof—without departing from my invention.

3 is a central column projecting above the horizontal line of the top of the glass contained in the receptacle and may be constructed, as shown in the drawing, with a flat upper surface or a conical top or of other suitable design adapted to distribute the downwardly-descending cooling fluid toward the interior wall of the draw. Said central column also prevents the molten glass contained in the receptacle from being chilled by the direct impact of the cooling fluid thereon. This same object of distributing the cooling fluid against the inner wall of the draw may also be effected by attaching to the extremity of the downwardly-extending pipe to be afterward described a conical or other suitable distributer.

4 is a cooler affecting the exterior surface of the draw of glass, which surrounds the same circumferentially, said cooler being preferably supported in the opening in the crown of the receptacle 2, in which it may be secured by means of lugs or other suitable devices. (Not shown.)

5 is the inlet-pipe for the admission of the cooling medium to cooler 4 at any convenient point, and 6 is the outlet so placed as to maintain a current through the cooler. In case air or similar cooling fluid be used in the cooler 4 I provide a series of ports 7, as shown at the right-hand side of the drawing, through which the cooling fluid may be permitted to escape against the outer surface of the glass or in proximity therewith. In such case outlet 6 would not be required.

Slidably supported on vertical guides 8, which are preferably supported from the bottom, is the gatherer 9, shown in the drawing as having attached to its gathering extremity a tubular draw of glass 10. Said gatherer 9 and its dependent draw of glass may be of cylindrical or other inclosed form, as desired, without departing from my invention. Slotted projections 11 on gatherer 9 engage guides 8, thus preventing torsional motion in the glass during the operation of drawing. Eyeholes 13 provide means for inserting suitable toggle or other mechanism for raising or lowering the gatherer.

14 is an inlet-orifice through which passes extensible tube 12, which tube is for the passage of a cooling fluid, said tube being capable of passing downwardly into the interior of the draw of glass 10 to discharge a cooling fluid therein at or substantially near the bottom of the draw and remaining at its lowest position during the drawing operation. It is evident that the diameter of tube 12 may be enlarged, so that it may cool the surrounding walls of the draw of glass by radiation. The upper extremity of the tube 12 has secured thereto a hollow piston 15, which reciprocates in the long cylinder 16 between the stops 17, thus limiting the reciprocation of said hollow piston and its attached tube 12.

18 represents a valve-seat in the upper end of the piston 15. 19 is a valve capable of engaging said seat and has secured to it a stem 20, which passes through an orifice in the end of the cylinder 16. A collar 21 is secured to said stem outside of the cylinder by means of a set-screw 22. Secured to the cylinder above the upper set of stops 17 is the inlet-pipe 23, having a valve 24.

25 represents an inlet-pipe connected to the cylinder below the lower row of stops 17 and has an ordinary three-way valve 26, which valve connects said inlet-pipe 25 with either the supply-pipe 28 or the exhaust 27, as may be desired.

29 is an escape for the excess of fluid from within the draw.

It is evident that the extensible tube 12 instead of depending vertically through the center of the gatherer might be passed through an opening at one side of the center of said gatherer similar to opening 29, in which case a flexible hose-coupling would be required to connect the tube outside of the gatherer with the source of the cooling fluid and to permit said tube to be fed by an attendant or suitable mechanism at the proper angle to permit said tube at all times during the process of drawing to discharge its cooling fluid at approximately the center of the bottom of the draw of glass.

The general operation of the machine is as follows: Assuming in the drawing that the gatherer 9 is lowered until its lower extremity enters the molten glass 1 contained in receptacle 2, such glass being of proper consistency for drawing into cylindrical or other inclosed form. After remaining a sufficient length of time to cause the glass to adhere to it said gatherer is raised at the speed best suited to cause the adhering glass to be drawn through the zone of low temperature within the cooler 4. As the gatherer continues to rise the air in the interior of the cylinder of drawn glass which follows up after the gatherer becomes highly heated and expands, but as the volume increases the pressure decreases. Therefore to prevent the cylinder from collapsing on account of the greater atmospheric pressure from without I admit a cooling fluid through the fixed pipe 23 and the extensible pipe 12, which preferably discharges at or near the bottom of the cylinder of glass adhering to the gatherer 9, thus forming a circulation of the cooling fluid through the interior of the cylinder and out by means of the escape 29. By this means I equalize the interior pressure with the exterior atmospheric pressure and cause both walls of the cylinder to be subjected to no unequal strain. After the gatherer has reached the desired height the lower end of the cylinder is severed from the glass contained in the tank by any suitable means. The operator then closes valve 24 on pipe 23 and opens valve 26, so that air or water, whichever may be used under pressure, can flow through pipes 28 and 25 and enter the space in the cylinder 16, formed between the under side of the piston 15 and the lower end of the cylinder, thereby forcing the extensible tube upward until the valve 19 seats itself in valve-seat 18, when both the valve 19 and the tube 12 continue to rise until the piston 15 comes into contact with the upper stops 17. Preferably the distance traveled by the tube 12 is sufficient to pass said tube out of orifice 14 and clear of the gatherer when the same is preferably at the top of guides 8, thereby permitting the gatherer to be disengaged from the guides 8 and allow its removal with the dependent glass. To continue the operation, preferably a second gatherer supported by toggle or other suitable supporting means secured in the eyeholes 13 is lowered over the upper extremities of the guides 8, which are free to receive the slotted projections 11 of the gatherer and lowered preferably until its lower extremity is immersed in the glass contained in the receptacle 2. The operator then opens valve 24, which admits a cooling fluid under pressure against the upper side of the piston 15. Three-way valve 26 is now turned until the pressure of fluid in pipe 28 is cut off and the flow of fluid is from the cylinder below the piston and out through the exhaust, thus permitting the tube 12 to be gradually lowered until it passes through the opening 14 in the gatherer 9 and rests, as preferably shown, at or near the bottom of the draw, while piston 15 is supported on the lower stops 17. During the downward movement of the tube 12 the valve 19 moves with it until the collar 21 comes in contact with the projection 30 of the cylinder, when the downward movement of the valve is stopped and a space is formed between it and the valve-seat 18, which is sufficient for the admission of the cooling fluid into the interior of the draw of glass, the operation of producing which may be now repeated.

While I have described minutely a method of putting my invention into practical use, I do not wish to limit myself thereby, but claim, broadly—

1. In the art of manufacturing glass, a gatherer adapted to draw glass in cylindrical or other inclosed form having an opening therein, means for discharging a cooling fluid through said opening at substantially the bottom of the draw during substantially the entire operation of drawing the glass and secondary means arranged within said draw for deflecting the current of discharged fluid toward the interior wall of the draw of glass.

2. In the art of manufacturing glass, a gatherer adapted to draw glass in cylindrical or other inclosed form having an opening therein, means for discharging a cooling fluid through said opening at substantially the bottom of the draw, a receptacle and means within said receptacle for deflecting the current of cooling fluid discharged from said first means from impinging directly upon the surface of the glass contained in said receptacle.

3. In the art of manufacturing glass, a gatherer adapted to draw glass in hollow form, an inlet-tube extending through said gatherer and movable longitudinally relative thereto and an outer cooler adjacent to said draw.

4. In the art of manufacturing glass, a gatherer, an inlet-tube arranged to extend into said gatherer, a hollow piston integral with said inlet-tube, said piston and tube movable longitudinally relative to said gatherer, an opening in said piston and means for closing said opening.

5. In the art of manufacturing glass, a gatherer, an inlet-tube arranged to extend into said gatherer, a hollow piston integral with said tube, said piston and tube movable longitudinally relative to said gatherer, an opening in said piston and a valve adapted to cover said opening.

6. In the art of manufacturing glass, a gatherer, an inlet-tube arranged to extend into said gatherer, a hollow piston integral with said tube, an opening in said piston, a valve adapted to cover said opening and a stop arranged to release said valve from said opening.

7. In the art of manufacturing glass, a gatherer, an inlet-tube extending into said gatherer and means situated below said tube adapted to deflect laterally a current of fluid discharged by said tube.

Signed at Pittsburg, Pennsylvania, this 26th day of December, 1903.

GEORGE H. HARVEY.

Witnesses:
ELVA STANIEK,
EDWARD A. LAWRENCE.